Figure 1:
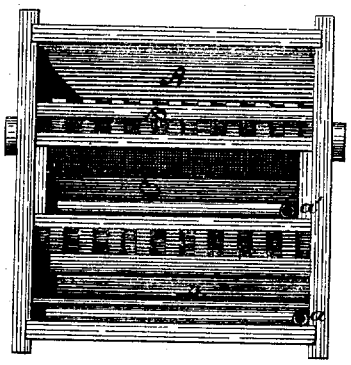

T. SAMPSON.

Improvement in Dye-Vats.

No. 5,103. Reissued Oct. 15, 1872.

WITNESSES.

Walter B. Vincent

John W. Taylor

INVENTOR.

Thomas Sampson

AM. PHOTO-LITHOGRAPHIC CO. N.Y. (OSBORNE'S PROCESS)

UNITED STATES PATENT OFFICE.

THOMAS SAMPSON, OF PROVIDENCE, RHODE ISLAND.

IMPROVEMENT IN DYE-VATS.

Specification forming part of Letters Patent No. 109,059, dated November 8, 1870; reissue No. 5,103, dated October 15, 1872.

*To all whom it may concern:*

Be it known that I, THOMAS SAMPSON, of the city and county of Providence, in the State of Rhode Island, have invented a new and Improved "Dye-Tub;" and I do hereby declare that the following specification, taken in connection with the drawing making a part of the same, is a full, clear, and exact description thereof.

Figure 2:
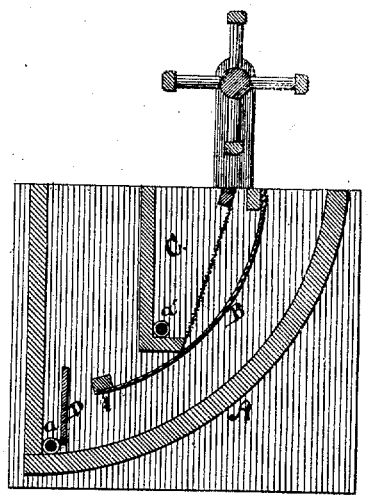
Figure 3:
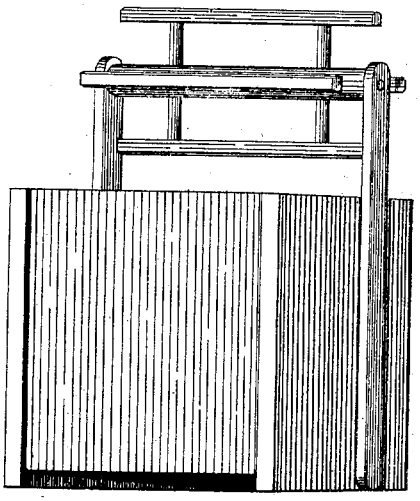

Figure 1 is a top view with reel removed; Fig. 2 is a cross-section; and Fig. 3 is an elevation.

The object of my invention is to so construct a dye-tub that the operation of dyeing the cloth may be more easily, and at the same time more thoroughly, performed; and consists in the device for that purpose hereinafter described.

The ordinary dye-tub now in use is a plain square or rectangular tub provided with a reel and steam-pipes, in a manner well understood, in which the die is placed, and into which the cloth is run. The great difficulty experienced is the tendency of the cloth to twist and knot, thus rendering it impossible for the dye to act evenly upon all portions of it.

In my invention I construct the tub with its two sides and one end perpendicular, as in the tubs now in use, while the other end and the bottom A form a segment of a circle, as shown in Fig. 2, or may be constructed at any desired angle that will produce a similar effect upon the descending cloth. I provide the tub with a slatted or close partition, B, the former being preferable, extending from the top nearly to the bottom of the opposite side. This partition B may be made to correspond with the curved side A, or of any irregular or circular shape that may be desired, its object being to prevent the cloth from rising to the surface, keep it extended from list to list in smooth folds, and in proper order lengthwise of the piece. I also provide the tub with a compartment, C, having its side near the partition B, of wire-gauze, within which the dye is placed. *a* and *a'* are steam-pipes. D is a partition, so placed with reference to the steam-pipe *a* that the cloth will be prevented thereby from coming in contact with the escaping steam.

The operation of my invention is as follows: The tub being provided with the requisite amount of liquid, one end of the cloth is placed upon the reel, drawn down through the liquid between the partition B and the side A to the surface. It is then united to the other end, thus forming a continuous band, when the reel is started in the proper direction. As the cloth descends into the tub it strikes against the curved part A, which lays it in smooth folds and prevents it from knotting or twisting in such a manner as to render less effective the action of the die. The cloth, by the accumulated weight of the successive folds, is forced into the liquid, the partition B preventing it from coming to the surface, keeping it extended in width, and confining it in such a manner that it may be easily drawn by the reel from the lower end of the said partition B in successive order to the surface, and over the reel, which is kept in motion until the cloth is sufficiently dyed.

What I claim as my invention, and desire to secure by Letters Patent, is—

1. A dye-tub having a curved or inclined side, A, for laying the cloth in folds as it descends thereon, in the manner substantially as described.

2. A dye-tub having a partition, D, so placed with reference to the steam-pipe *a* that the cloth will be prevented thereby from coming in contact with the escaping steam.

3. A dye-tub having a partition, B, arranged in the manner substantially as described, for the purposes specified.

4. A dye-tub having a partition, B, in combination with a compartment, C, the whole constructed and arranged in the manner substantially as described.

THOMAS SAMPSON.

Witnesses:
WALTER B. VINCENT,
JOHN D. W. TAYLOR.